(12) United States Patent
Gaither (10) Patent No.: US 10,207,717 B2
(45) Date of Patent: Feb. 19, 2019

(54) COASTING TIMER FOR PREDICTIVE ACCELERATION

(71) Applicant: Toyota Motor Engineering & Manufacturing North America, Inc., Erlanger, KY (US)

(72) Inventor: Geoffrey David Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 56 days.

(21) Appl. No.: 15/430,801

(22) Filed: Feb. 13, 2017

(65) Prior Publication Data

US 2018/0194358 A1    Jul. 12, 2018

Related U.S. Application Data

(60) Provisional application No. 62/444,983, filed on Jan. 11, 2017.

(51) Int. Cl.
*B60W 50/00* (2006.01)
*B60W 30/18* (2012.01)

(52) U.S. Cl.
CPC .. *B60W 50/0097* (2013.01); *B60W 30/18072* (2013.01); *B60W 2050/0014* (2013.01); *B60W 2050/0026* (2013.01); *B60W 2520/105* (2013.01); *B60W 2540/10* (2013.01); *B60W 2540/30* (2013.01); *B60W 2710/0655* (2013.01); *B60W 2710/18* (2013.01)

(58) Field of Classification Search
CPC ... B60W 30/18072; B60W 2050/0014; B60W 2050/0026; B60W 2520/105; B60W 2540/10; B60W 2540/30; B60W 2710/0655; B60W 2710/18
See application file for complete search history.

(56) References Cited

U.S. PATENT DOCUMENTS

| 5,445,576 A | * | 8/1995 | Motamedi | B60W 30/18 477/102 |
| 6,364,434 B1 | * | 4/2002 | Sway-Tin | B60L 15/20 303/152 |

(Continued)

FOREIGN PATENT DOCUMENTS

WO    WO 2017075578 A1 *   5/2017    ............. G06F 19/00

*Primary Examiner* — Calvin Cheung
(74) *Attorney, Agent, or Firm* — Christopher G. Darrow; Darrow Mustafa PC (57) ABSTRACT

Described herein are various embodiments for a coasting timer for predictive acceleration. In an embodiment, a system for predictive acceleration of a vehicle is described. The system may comprise an accelerator pedal; a sensor coupled to the accelerator pedal, the sensor configured to measure depression of the accelerator pedal; and an electronic control unit (ECU). The ECU may be configured to: determine a current coasting map; determine a coasting interval duration based, at least in part, on the current coasting map; determine the coasting interval duration has started based, at least in part, upon a measurement received from the sensor; and activate one or more subsystems of the vehicle prior to the end of the coasting interval duration, the one or more subsystems determined based, at least in part, on a predicted acceleration type.

16 Claims, 6 Drawing Sheets

(56) References Cited

U.S. PATENT DOCUMENTS

| | | | |
|---|---|---|---|
| 6,625,535 B2 | 9/2003 | Han et al. | |
| 9,026,296 B1* | 5/2015 | Johri | B60W 20/10 |
| | | | 701/22 |
| 2007/0082784 A1* | 4/2007 | Walker | B60W 10/11 |
| | | | 477/107 |
| 2012/0010796 A1* | 1/2012 | G V | B60W 30/19 |
| | | | 701/70 |
| 2012/0078467 A1 | 3/2012 | Schweikl et al. | |
| 2012/0197500 A1* | 8/2012 | Sujan | B60W 50/0097 |
| | | | 701/51 |
| 2013/0035839 A1 | 2/2013 | Otanez et al. | |
| 2013/0131943 A1* | 5/2013 | Iwao | F16D 48/066 |
| | | | 701/67 |
| 2014/0081498 A1* | 3/2014 | Weng | B60L 7/18 |
| | | | 701/22 |
| 2015/0158502 A1* | 6/2015 | Nappo | B60L 15/025 |
| | | | 105/73 |
| 2015/0329119 A1* | 11/2015 | Sujan | F02D 41/08 |
| | | | 701/54 |

* cited by examiner

COASTING TIMER FOR PREDICTIVE ACCELERATION

CROSS REFERENCE TO RELATED APPLICATIONS

This application claims benefit of U.S. Provisional Application No. 62/444,983, filed on Jan. 11, 2017, which is herein incorporated by reference in its entirety.

TECHNICAL FIELD

The subject matter described herein relates in general to acceleration of a vehicle and, more particularly, to a coasting timer for predictive acceleration.

BACKGROUND

Vehicle drivers cannot hold their foot perfectly still while driving. When the driver is cruising at a particular speed, the driver will occasionally move their foot causing an acceleration of the vehicle. Sometimes it is a positive acceleration, e.g., pressing down on the accelerator. Sometimes it is a negative acceleration, e.g., removing their foot from the accelerator pedal.

SUMMARY

This disclosure describes various embodiments for a coasting timer for predictive acceleration. In an embodiment, a system for predictive acceleration of a vehicle is described. The system may comprise an accelerator pedal; a sensor coupled to the accelerator pedal, the sensor configured to measure depression of the accelerator pedal; and an electronic control unit (ECU). The ECU may be configured to: determine a current coasting map; determine a coasting interval duration based, at least in part, on the current coasting map; determine the coasting interval duration has started based, at least in part, upon a measurement received from the sensor; and activate one or more subsystems of the vehicle prior to the end of the coasting interval duration, the one or more subsystems determined based, at least in part, on a predicted acceleration type.

In another embodiment, a method for predictive acceleration of a vehicle is described. The method may comprise determining, by an electronic control unit (ECU), a current coasting map; determining, by the ECU, a coasting interval duration based, at least in part, on the current coasting map; determining, by the ECU, the coasting interval duration has started based, at least in part, upon a measurement received from a sensor coupled to an accelerator pedal; and activating, by the ECU, one or more subsystems of the vehicle prior to the end of the coasting interval duration, the one or more subsystems determined based, at least in part, on a predicted acceleration type.

In another embodiment, a system for predictive acceleration of a vehicle is described. The system may comprise an accelerator pedal; a sensor coupled to the accelerator pedal, the sensor configured to measure depression of the accelerator pedal; and an electronic control unit (ECU). The ECU may be configured to determine a driver profile does not contain a driver coasting map; determine a baseline coasting map; determine a coasting interval duration based, at least in part, on the baseline coasting map; determine the coasting interval duration has started based, at least in part, upon a measurement received from the sensor; activate one or more subsystems of the vehicle prior to the end of the coasting interval duration, the one or more subsystems determined based, at least in part, on a predicted acceleration type; and create a first driver coasting map based, at least in part, on a first observed driving pattern of the vehicle.

DETAILED DESCRIPTION

Described herein are systems and methods for a coasting timer for predictive acceleration. An electronic control unit (ECU) may predict acceleration, either negative or positive, based upon previously observed behavior. The vehicle may then prepare for those accelerations to provide, for example, improved fuel economy, response times, and/or vehicle safety. Actions described as taken by an ECU maybe taken by any subsystem of the vehicle capable of controlling vehicle subsystems and/or monitoring driving behaviors.

The driver made typically hold the accelerator pedal while driving normally to maintain the current speed with only minor fluctuations in the depression percentage of the accelerator pedal. For example, the accelerator pedal may move +/−2% while coasting. The ECU may be configured to anticipate an acceleration. As used herein, acceleration may include positive or negative acceleration. The anticipated acceleration may be based on acquired anthropomorphic data about the vehicle driver or may be based on an average driver. For example, the anthropomorphic data may suggest that the driver cannot sustain the current accelerator pedal position and/or vehicle speed within a specific margin for more than a certain period of time. If the ECU can predict the period of time for a given driver, the ECU may control vehicle subsystems preemptively based on the value. The ECU may learn a driver's behavior through logging actual driving data over a series of trips. The actual driving data may be used to modify baseline coasting maps and/or to create new coasting maps.

The system may include an accelerator pedal sensor that may detect the current position of depression of the accelerator pedal. The system may also include a timer. If the accelerator pedal is maintained in the same position, or substantially the same position, for a predetermined period of time, then the system may be configured to predict that the driver will accelerate.

The ECU may use the predicted acceleration to automatically take various preemptive actions to facilitate the acceleration. For example, a hybrid vehicle may include an engine and electric motors, for controlling engine speed. When an acceleration is predicted, the engine speed may be increased without actually firing the engine to shorten the ramp up time for the anticipated acceleration. As a further example, when a negative acceleration, e.g., deceleration, is predicted, the ECU may be able to temporarily increase regenerative braking to improve braking performance.

The ECU may initially be set to predict acceleration after the accelerator pedal is held in a position for predetermined period of time. This predetermined period of time may be fixed or may be adjusted over time based on the driving habits of the particular driver. For example, an aggressive driver may accelerate and coast on approximately five second intervals. Initially the ECU may be configured to predict at fifteen second intervals, however, over time, the ECU may determine to change the initially configured value from fifteen seconds to five seconds based on the patterns of the aggressive driver.

Figure 1:
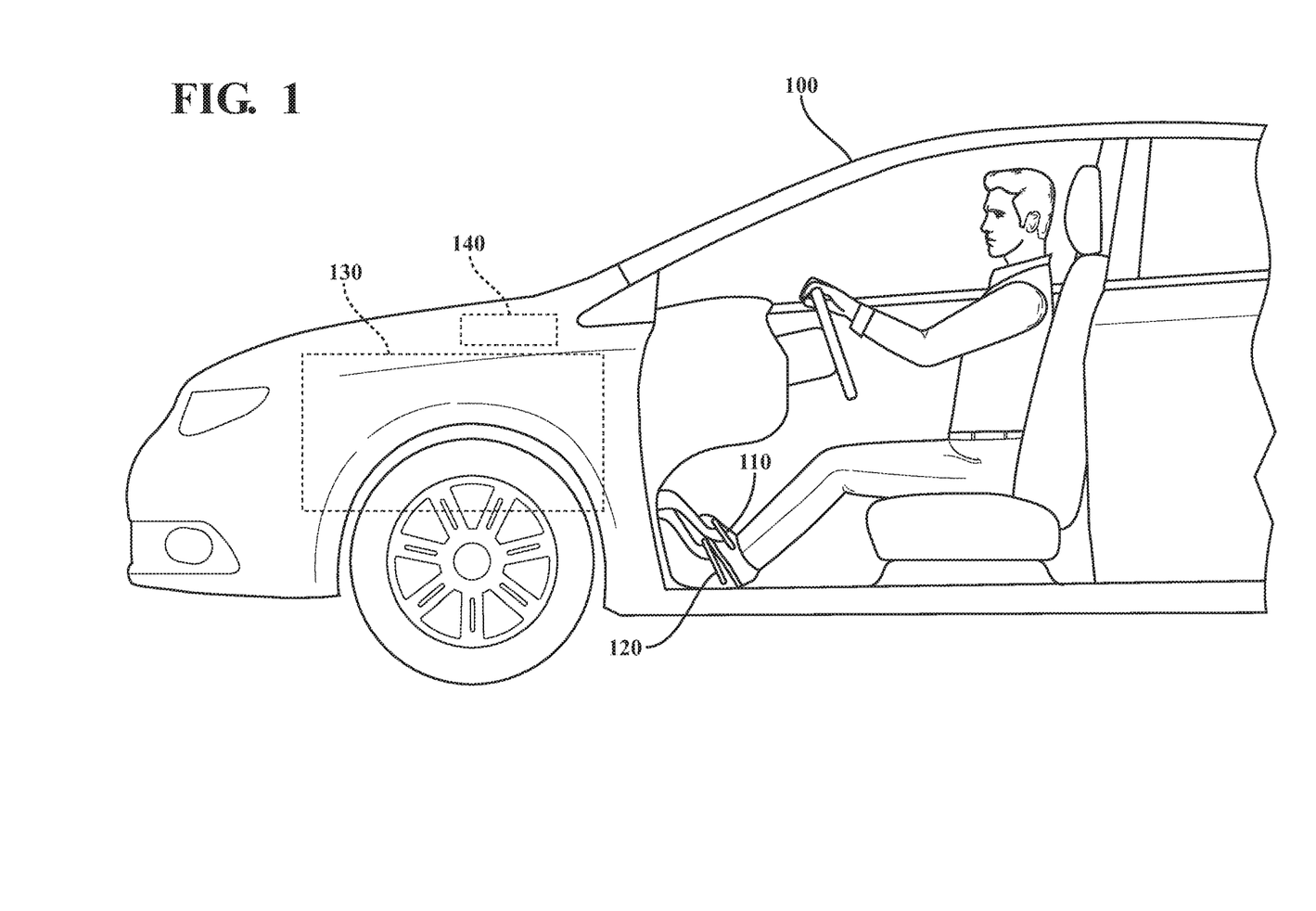
FIG. 1 is a diagram of an embodiment of a vehicle comprising a coasting timer.

FIG. 1 is a diagram of an embodiment of a vehicle 100 comprising a coasting timer. As used herein, a "vehicle" may be any form of motorized transport. In one or more implementations, the vehicle 100 may be an automobile. While arrangements will be described herein with respect to automobiles, it will be understood that embodiments are not limited to automobiles. In some implementations, the vehicle 100 may be any other form of motorized transport. Vehicle 100 may comprise an accelerator pedal 120 and a brake pedal 110. The vehicle may also comprise an engine 130 and an electronic control unit (ECU) 140. The electronic control unit 140 may control various subsystems of vehicle 100. For example, electronic control unit 140 may control the function of engine 130. Electronic control unit 140 may also monitor various subsystems of the vehicle 100. For example, electronic control unit 140 may monitor the position of accelerator pedal 120 and brake pedal 110. Based on observations of the position of accelerator pedal 120 and/or brake pedal 110 electronic control unit 140 may provide inputs controlling other subsystems of vehicle 100. For example, as the accelerator pedal 120 is depressed electronic control unit 140 may prepare engine 130 to accelerate. As a further example, as brake pedal 110 is depressed, electronic control unit 140 may prepare a regenerative braking system (not pictured) for input.

Figure 2:
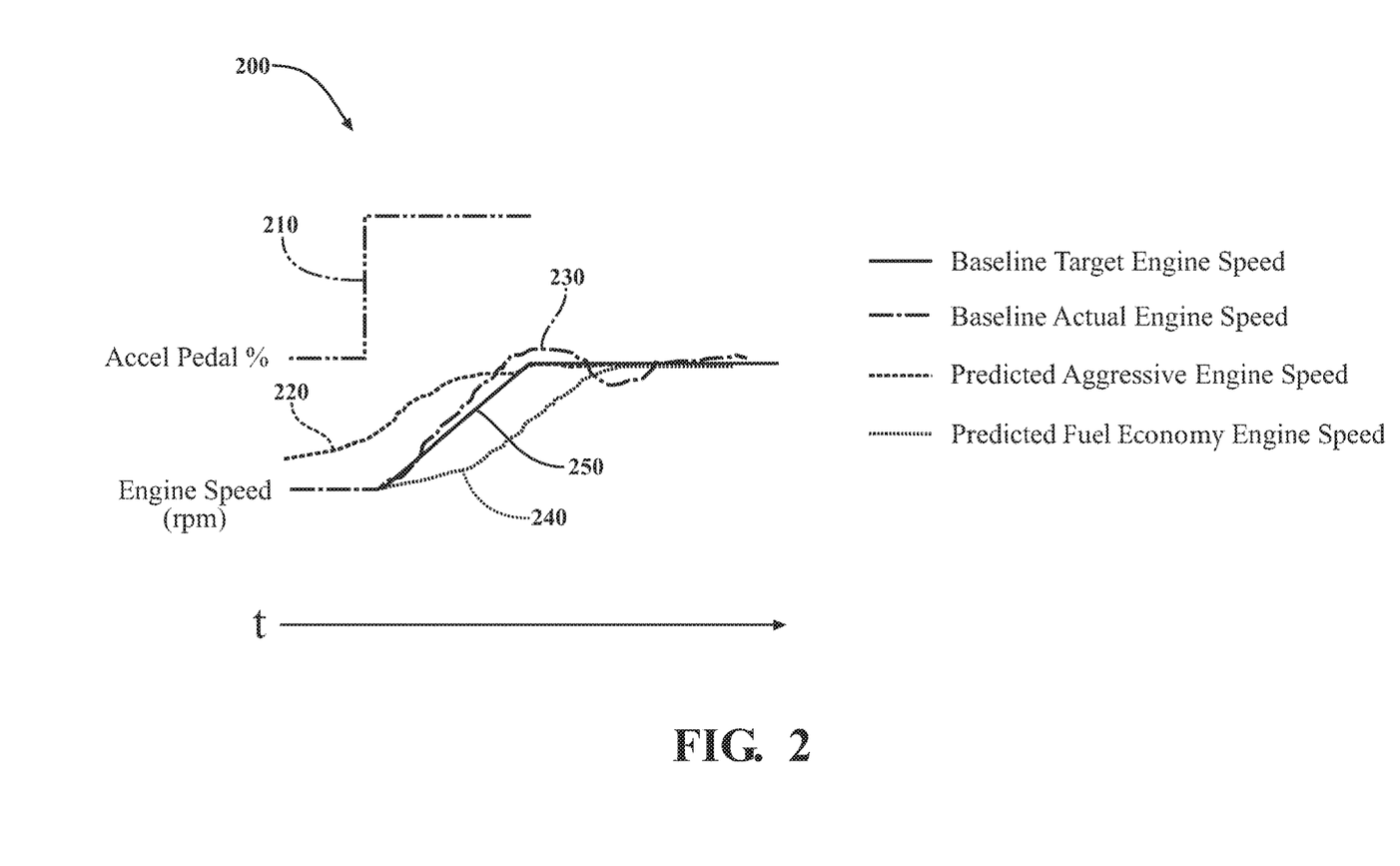
FIG. 2 is a diagram of an embodiment of engine behavior when an accelerator pedal is depressed.

FIG. 2 is a diagram of an embodiment of engine behavior when an accelerator pedal, e.g., accelerator pedal 120, is depressed. Line 210 depicts an accelerator pedal position. The accelerator pedal position may be indicated as a percent of depression. For example, if the driver has his foot off of the accelerator pedal, the percentage would be 0%. If the accelerator pedal is fully depressed, the percentage would be 100%. Line 250 represents a baseline target engine speed. As the accelerator pedal percentage increases as shown by line 210, the engine speed revolutions per minute (RPM) may increase accordingly. Line 230 represents a baseline actual engine speed. As the accelerator pedal percentage increases as shown by line 210, the engine speed RPM may increase as well. The baseline actual engine speed, may exceed the target engine speed and then dip below the target engine speed in order to compensate.

Line 240 represents a predicted fuel economy engine speed. The predicted fuel economy engine speed may represent the engine RPMs predicted for a non-aggressive driver. If the driver is non-aggressive, then the engine RPMs may be ramped slowly. An ECU, e.g., ECU 140, may determine that a non-aggressive driver is driving the vehicle. When this type of prediction is made, the ECU may preemptively begin ramping the engine RPMs in anticipation of the driver pressing the accelerator pedal.

Line 220 represents a predicted aggressive engine speed. The predicted aggressive engine speed may represent the engine RPMs predicted for an aggressive driver. If the driver is aggressive, then the engine RPMs may be ramped sooner that when a non-aggressive driver is driving the vehicle. An ECU, e.g., ECU 140, may determine that an aggressive driver is driving the vehicle. When this type of prediction is made, the ECU may preemptively begin ramping the engine RPMs in anticipation of the driver pressing the accelerator pedal.

Figure 3:
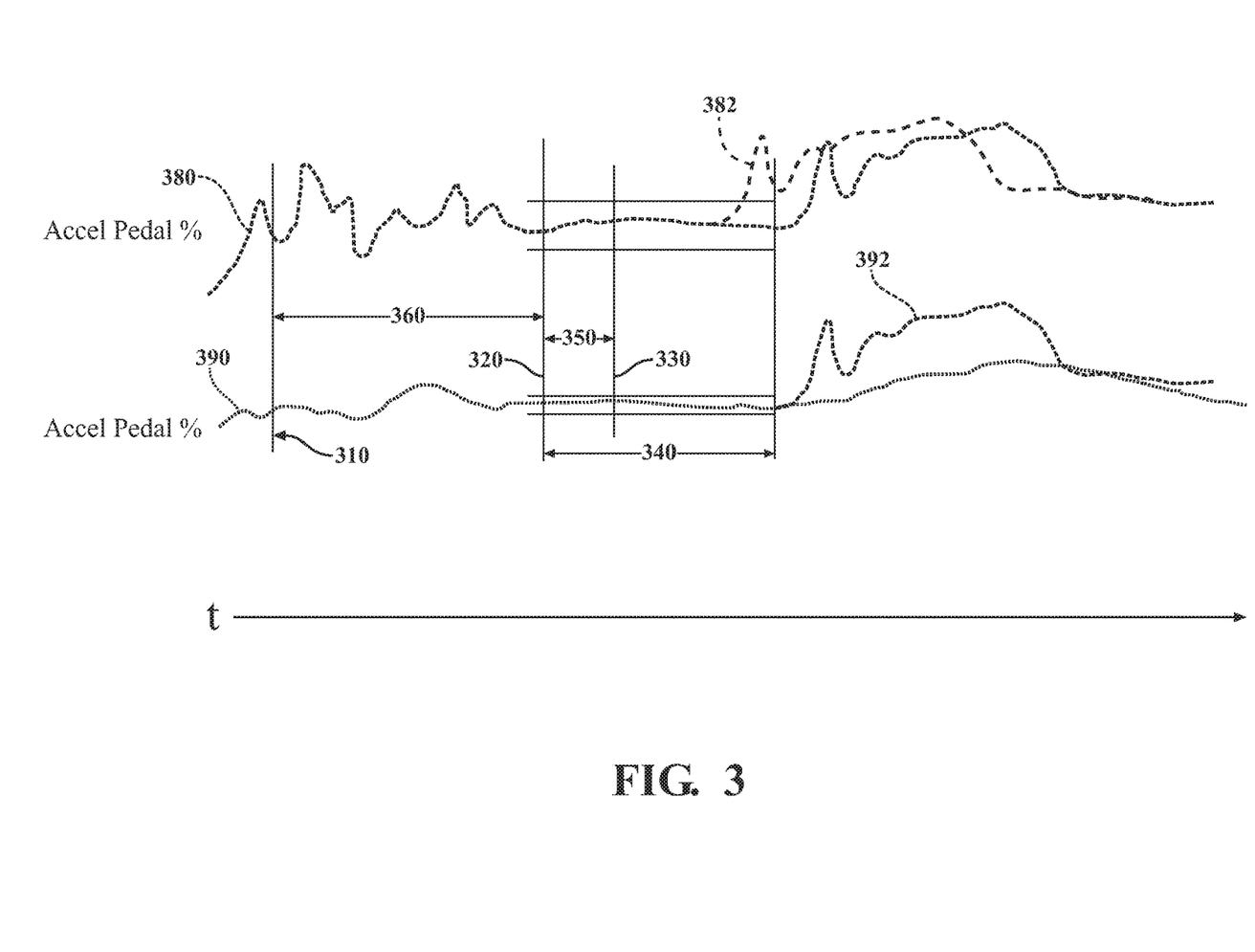
FIG. 3 is a diagram of an embodiment of coasting and acceleration periods.

FIG. 3 is a diagram of an embodiment of coasting and acceleration periods. Line 380 represents an accelerator pedal depression percentage for an aggressive driver. Line 390 represents an accelerator pedal depression percentage for a non-aggressive driver, e.g., a more fuel economic driver. Line 380 may fluctuate more rapidly than line 390. The increased fluctuations of pedal depression percentage may indicate an aggressive driver quickly pressing the accelerator pedal.

At time 310, an ECU may begin monitoring the accelerator pedal to determine when coasting may begin. During this time the ECU may make determinations as to whether the driver is the aggressive or non-aggressive. The ECU may choose a coasting map that corresponds to the type of driver. If the driver is identified by the ECU as a driver that already has one or more coasting maps stored, the ECU may retrieve one of the stored coasting maps. If a driver is driving aggressively, the ECU may retrieve an aggressive coasting map for the driver that has been previously stored. If a driver is driving non-aggressively, the ECU may retrieve a non-aggressive coasting map for the driver that has been previously stored. If the current driver does not have any stored coasting maps, the ECU may retrieve a baseline map for the current driving style.

At time 320, the vehicle may begin coasting. During time interval 360, the ECU may predict how long the coasting interval 340 may last. At time 330, the ECU may determine that a coasting interval is ongoing. The ECU may determine that the coasting interval 340 started at time 320. The ECU may further determine how long the coasting interval 340 may last. Based on this determination, the ECU may predict a change in the accelerator pedal depression percent. Based upon the predicted change, the ECU may prepare subsystems of the vehicle for the change in the accelerator pedal depression percent. For example, the ECU may prepare a regenerative braking system if there is going to be negative acceleration. In another example, the ECU may prepare the engine to accelerate if there is going to be positive acceleration.

In an embodiment, the ECU may detect an accelerator pedal depression percentage change prior to the end of coasting interval 340. The driver may accelerate prior to the end of coasting interval 340. The acceleration may correspond to line 382. In this case, the ECU may adjust the coasting interval associated with this driver that is stored in a coasting map associated with the driver.

In an embodiment, the ECU may detect an accelerator pedal depression percentage change prior after the end of coasting interval 340. The ECU may detect an aggressive pattern corresponding to line 392. If the ECU had previously selected a coasting map associated with a non-aggressive driver and then detects accelerator pedal behavior depicted by line 392, the ECU may select a different coasting map corresponding to an aggressive driving pattern. Other variations from a predicted coasting pattern may result in further updates to a driver's coasting maps. In addition, information may be collected regarding various driver types, the information may be used in preparing baseline coasting maps for different types of drivers.

Figure 4:
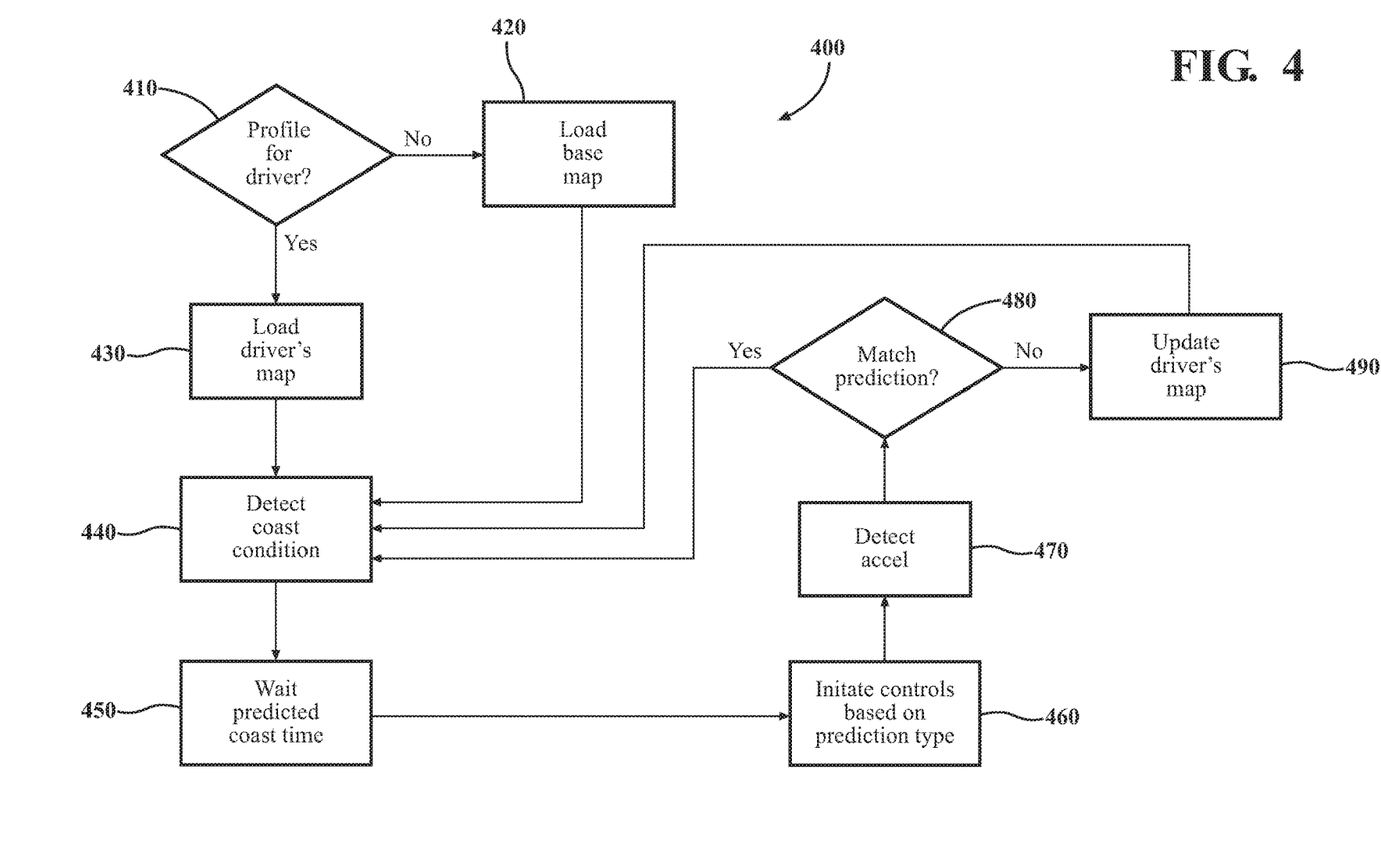
FIG. 4 is a flow diagram of an embodiment of a method for coasting interval prediction.

FIG. 4 is a flow diagram of an embodiment of a method 400 for coasting interval prediction. Method 400 may begin at block 410 when an ECU, e.g., ECU 140, may determine whether a profile exists for the current driver of a vehicle.

The profile may contain one or more coasting maps for the driver. If the driver has coasting maps stored in the profile, the ECU may load the driver's coasting map at step 430. Prior to loading the coasting map, the ECU may determine if more than one coasting map is available for the driver. If more than one coasting map is available for the driver, the ECU may determine how the driver is driving in this situation. The ECU may select the type of coasting map based upon observed behaviors of the driver. The driver's behaviors may be observed during the first few seconds or longer while the driver is driving. For example, during time interval 360, the ECU may determine that the driver is driving aggressively and may select a coasting map associated with the driver and aggressive driving behavior.

If the profile for the driver does not exist or does not contain any coasting maps, the ECU may load a baseline coasting map at block 420. The ECU may select the type of baseline coasting map based upon observed behaviors of the driver. These behaviors may be observed during the first few seconds or longer while the driver is driving. For example, during time interval 360 the ECU may determine that the driver is driving aggressively and may then select a baseline coasting map associated with aggressive driving behavior.

At block 440, the ECU may determine that the vehicle has entered a coast condition. When the ECU has determined that the vehicle has entered a coasting condition, the ECU may wait a predicted coast time determined based on the coasting map loaded by the ECU. After the predicted coast time has expired, the ECU may control one or more subsystems of the vehicle based upon the prediction type. For example, if it is predicted that a negative acceleration may occur, the ECU may cause a regenerative braking system to engage. At block 470, the ECU may detect an acceleration. The acceleration may be a positive acceleration, e.g., depressing of the accelerator pedal, or may be a negative acceleration, e.g., lifting the foot from the accelerator pedal or depressing the brake pedal.

After the ECU detects the acceleration at block 470, the ECU may compare the detected acceleration with a predicted acceleration. The ECU may compare when the acceleration actually occurred with the predicted time of acceleration. If the times did not match the ECU may update the drivers coasting map at block 490. If the time when the acceleration actually occurred matches the predicted time of acceleration, the method may return to block 440 when the ECU detects the next coasting condition. The ECU may compare the detected type of acceleration with the predicted type of acceleration. If the detected type of acceleration does not match the predicted type of acceleration, the ECU may update the drivers coasting map at block 490. The update may make corrections to the coasting map selected at block 430 or may select a new coasting map based upon the type of driving of the driver. If the detected type of acceleration matches the predicted type of acceleration, the method may return to block 440 when the ECU detects the next coasting condition.

Figure 5:
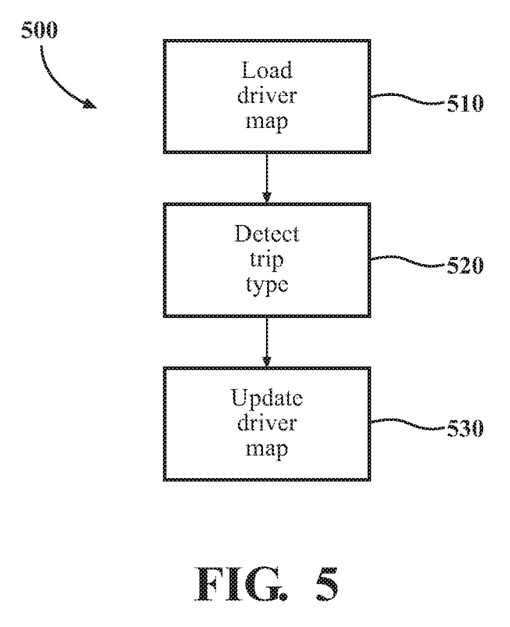
FIG. 5 is a flow diagram of an embodiment of a method for updating a driver's coasting map.

FIG. 5 is a flow diagram of an embodiment of a method 500 for updating a driver's coasting map. The method 500 may begin when an ECU selects a driver's coasting map. The ECU may select the coasting map based upon observation made when the trip begins, e.g., interval 360. In another embodiment, the ECU may select a coasting map for the driver based on typical driving traits of the driver. For example, if the driver typically exhibits aggressive driving characteristics, the ECU may select the driver's aggressive coasting map. After loading the driver's coasting amp, the ECU may continue monitoring the driver's behavior. The ECU may determine that the driver is not driving aggressively on this particular trip at block 520. At block 530 the ECU may select a non-aggressive coasting map to use in place of the previously selected aggressive coasting map. This may be useful for situations where a driver usually drives with certain behaviors, but may occasionally drive using different behaviors. In this case, the ECU may choose a coasting map that corresponds to the behaviors for that particular trip.

Figure 6:
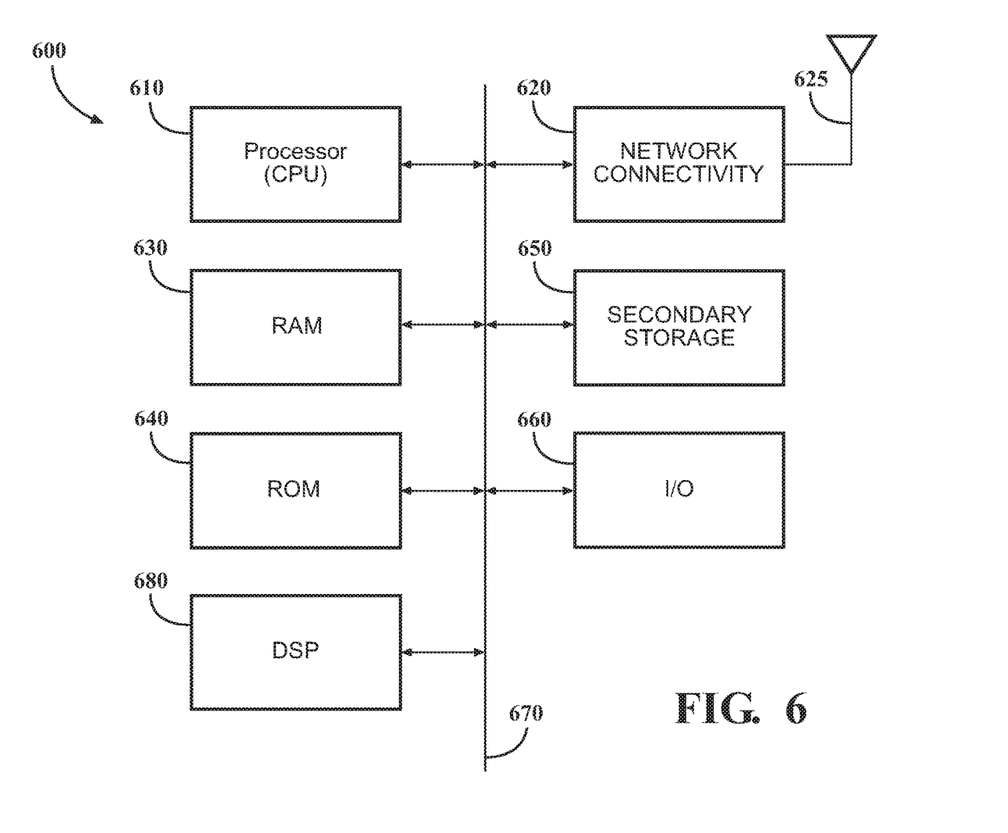
FIG. 6 is a diagram of an embodiment of a system for implementing a coasting timer for predictive acceleration.

FIG. 6 is a diagram of an embodiment of a system 600 that includes a processor 610 suitable for implementing one or more embodiments disclosed herein. For example, an ECU 140 that executes modules for implementing methods 400 and 500.

The processor 610 may control the overall operation of the system. In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP) 680. Although the DSP 680 is shown as a separate component, the DSP 680 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). The processor 610 may execute modules that comprise instructions that correspond to method 400 and/or method 500.

While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips and may be a hardware device capable of executing computer instructions.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, controller area network (CAN), domestic digital bus (D2B), and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 625 might be considered to be a component of the I/O devices 660 instead of or in addition to being a component of the network connectivity devices 620.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

It will be understood by one having ordinary skill in the art that construction of the described invention and other components is not limited to any specific material. Other exemplary embodiments of the invention disclosed herein may be formed from a wide variety of materials, unless described otherwise herein.

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A system for predictive acceleration of a vehicle, the system comprising:
   an accelerator pedal;
   a sensor coupled to the accelerator pedal, the sensor configured to measure depression of the accelerator pedal;
   a memory configured to store a plurality of coasting maps; and
   an electronic control unit (ECU) configured to:
   determine a current coasting map, the current coasting map selected from the plurality of coasting maps;
   determine a coasting interval duration based, at least in part, on the current coasting map;
   determine the coasting interval duration has started based, at least in part, upon a measurement received from the sensor; and
   activate one or more subsystems of the vehicle prior to the end of the coasting interval duration, the one or more subsystems determined based, at least in part, on a predicted acceleration type.

2. The system of claim 1, wherein the plurality of coasting maps comprises one or more driver specific coasting maps and one or more baseline coasting maps.

3. A system for predictive acceleration of a vehicle, the system comprising:
an accelerator pedal;
a sensor coupled to the accelerator pedal, the sensor configured to measure depression of the accelerator pedal; and
an electronic control unit (ECU) configured to:
determine a current coasting map;
determine a coasting interval duration based, at least in part, on the current coasting map;
determine the coasting interval duration has started based, at least in part, upon a measurement received from the sensor; and
activate one or more subsystems of the vehicle prior to the end of the coasting interval duration, the one or more subsystems determined based, at least in part, on a predicted acceleration type, wherein the predicted acceleration type is one of the following:
a negative acceleration, and the one or more subsystems comprises a regenerative braking system; and
a positive acceleration, and the one or more subsystems comprises an engine.

4. A system for predictive acceleration of a vehicle, the system comprising:
an accelerator pedal;
a sensor coupled to the accelerator pedal, the sensor configured to measure depression of the accelerator pedal; and
an electronic control unit (ECU) configured to:
determine a current coasting map;
determine a coasting interval duration based, at least in part, on the current coasting map;
determine the coasting interval duration has started based, at least in part, upon a measurement received from the sensor;
activate one or more subsystems of the vehicle prior to the end of the coasting interval duration, the one or more subsystems determined based, at least in part, on a predicted acceleration type;
determine an acceleration has occurred prior to the end of the coasting interval duration; and
modify the current coasting map.

5. A system for predictive acceleration of a vehicle, the system comprising:
an accelerator pedal;
a sensor coupled to the accelerator pedal, the sensor configured to measure depression of the accelerator pedal; and
an electronic control unit (ECU) configured to:
determine a current coasting map;
determine a coasting interval duration based, at least in part, on the current coasting map;
determine the coasting interval duration has started based, at least in part, upon a measurement received from the sensor;
activate one or more subsystems of the vehicle prior to the end of the coasting interval duration, the one or more subsystems determined based, at least in part, on a predicted acceleration type;
determine a driving pattern of the vehicle is inconsistent with the current coasting map; and
determine an updated coasting map based, at least in part, on the driving pattern.

6. The system of claim 5, wherein the current coasting map is consistent with non-aggressive driving, and the updated coasting map is consistent with aggressive driving.

7. A method for predictive acceleration of a vehicle, the method comprising:
determining, by an electronic control unit (ECU), a current coasting map;
determining, by the ECU, a coasting interval duration based, at least in part, on the current coasting map;
determining, by the ECU, the coasting interval duration has started based, at least in part, upon a measurement received from a sensor coupled to an accelerator pedal;
activating, by the ECU, one or more subsystems of the vehicle prior to the end of the coasting interval duration, the one or more subsystems determined based, at least in part, on a predicted acceleration type; and
storing, by the ECU, a plurality of coasting maps in a memory, the current coasting map selected from the plurality of coasting maps.

8. The method of claim 7, wherein the plurality of coasting maps comprises one or more driver specific coasting maps and one or more baseline coasting maps.

9. A method for predictive acceleration of a vehicle, the method comprising:
determining, by an electronic control unit (ECU), a current coasting map;
determining, by the ECU, a coasting interval duration based, at least in part, on the current coasting map;
determining, by the ECU, the coasting interval duration has started based, at least in part, upon a measurement received from a sensor coupled to an accelerator pedal; and
activating, by the ECU, one or more subsystems of the vehicle prior to the end of the coasting interval duration, the one or more subsystems determined based, at least in part, on a predicted acceleration type, wherein the predicted acceleration type is one of the following:
a negative acceleration, and the one or more subsystems comprises a regenerative braking system; and
a positive acceleration, and the one or more subsystems comprises an engine.

10. A method for predictive acceleration of a vehicle, the method comprising:
determining, by an electronic control unit (ECU), a current coasting map;
determining, by the ECU, a coasting interval duration based, at least in part, on the current coasting map;
determining, by the ECU, the coasting interval duration has started based, at least in part, upon a measurement received from a sensor coupled to an accelerator pedal;
activating, by the ECU, one or more subsystems of the vehicle prior to the end of the coasting interval duration, the one or more subsystems determined based, at least in part, on a predicted acceleration type; and
determining, by the ECU, an acceleration has occurred prior to the end of the coasting interval duration; and
modifying, by the ECU, the current coasting map.

11. A method for predictive acceleration of a vehicle, the method comprising:
determining, by an electronic control unit (ECU), a current coasting map;
determining, by the ECU, a coasting interval duration based, at least in part, on the current coasting map;
determining, by the ECU, the coasting interval duration has started based, at least in part, upon a measurement received from a sensor coupled to an accelerator pedal;
activating, by the ECU, one or more subsystems of the vehicle prior to the end of the coasting interval duration, the one or more subsystems determined based, at least in part, on a predicted acceleration type; and determining, by the ECU, a driving pattern of the vehicle is inconsistent with the current coasting map; and determining, by the ECU, an updated coasting map based, at least in part, on the driving pattern.

12. The method of claim 11, wherein the current coasting map is consistent with non-aggressive driving, and the updated coasting map is consistent with aggressive driving.

13. A system for predictive acceleration of a vehicle, the system comprising:

an accelerator pedal;

a sensor coupled to the accelerator pedal, the sensor configured to measure depression of the accelerator pedal;

an electronic control unit (ECU) configured to:
 determine a driver profile does not contain a driver coasting map;
 determine a baseline coasting map;
 determine a coasting interval duration based, at least in part, on the baseline coasting map;
 determine the coasting interval duration has started based, at least in part, upon a measurement received from the sensor;
 activate one or more subsystems of the vehicle prior to the end of the coasting interval duration, the one or more subsystems determined based, at least in part, on a predicted acceleration type; and
 create a first driver coasting map based, at least in part, on a first observed driving pattern of the vehicle.

14. The system of claim 13, wherein the ECU is further configured to store the first driver coasting map in a memory coupled to the ECU.

15. The system of claim 14, wherein the ECU is further configured to update the first driver coasting map on a subsequent trip by the vehicle.

16. The system of claim 14, wherein the ECU is further configured to create a second driver coasting map based, at least in part, on a second observed driving pattern of the vehicle, the second observed driving pattern of the vehicle inconsistent with the first observed driving pattern of the vehicle.

* * * * *